Patented June 18, 1940

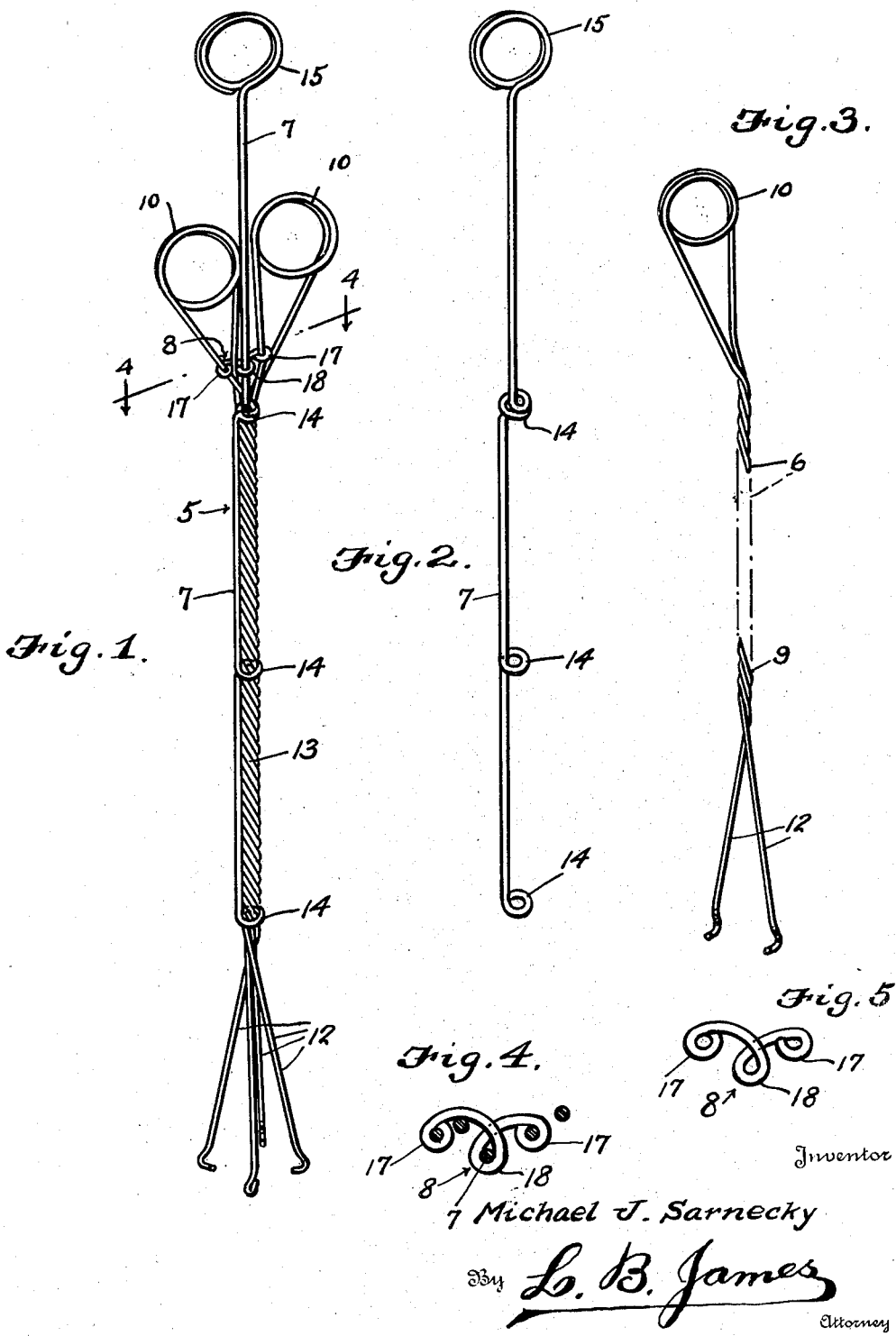

2,204,734

UNITED STATES PATENT OFFICE 2,204,734

PICKING TOOL

Michael Joseph Sarnecky, Edwardsville, Pa.

Application September 7, 1939, Serial No. 293,831

1 Claim. (Cl. 294—100)

This invention relates to tools and more particularly a picking tool.

The primary object of this invention resides in the provision of a picking tool adapted to grasp articles in places where an individual cannot reach them with his fingers.

Another object of this invention resides in the provision of a picking tool adapted to be inserted within a bottle or the like and closed upon an object to be removed therefrom.

A further object of this invention resides in the provision of a picking tool consisting of a plurality of particularly constructed elements associated in cooperative relation to permit operation of the tool with one hand.

With these and other objects in view this invention resides in certain novel features of construction and arrangement of elements to be hereinafter more particularly set forth in the specification, illustrated in the accompanying drawing and pointed out in the appended claim and, while this disclosure depicts my present conception of the invention, the right is reserved to resort to such changes in construction as come within the scope of the claim.

In the accompanying drawing forming a part of this application:

Figure 1 is a perspective view of a picking tool as constructed in accordance with this invention, the same being shown with its tongs in open position.

Figure 2 is a detail perspective view of the tong operating rod.

Figure 3 is a detail perspective view of one of the tong members.

Figure 4 is a detail sectional view approximately on line 4—4 of Figure 1.

Figure 5 is a detail perspective view of the combined rod guide and handle brace.

In the present embodiment of this invention the numeral 5 designates, in general, a picking tool which consists of companion tong members 6, a tong operating rod 7 and a combined rod guide and handle brace 8.

In the present disclosure there are two companion tong members 6 each being formed from single strands of wire which are twisted upon themselves at their medial portions as at 9 with one end thereof extended from the twisted portion and bent into offset finger receiving loops 10 and their opposite ends spread with their free extremities formed into downwardly extending tongs 12. With the tongs so formed they are then twisted together as at 13 disposing the finger receiving loops 10 in close relation at one end of the medial portions thereof and the tongs 12 in spread opposed relation at the opposite end thereof.

Formed on the tong operating rod 7 as by bending are aligned loops 14 adapted to slidably surround the twisted medial portion of the tong members, the lowermost loop operating to close the normally spread tongs 12 upon sliding the rod toward the same by a thumb receiving loop 15 formed on the opposite end of the rod and disposed in close relation to the tong receiving loops 10 of the tong members.

In order to secure the finger receiving loops 10 in rigid relation to one another and form a guide for the rod 7 the combined rod guide and handle brace 8 has its free ends looped around the shanks of the finger loops as indicated at 17 and its medial portion looped around the rod as indicated at 18.

In order to operate this tool it is held by inserting the middle and forefingers in the finger loops 10 with the thumb inserted in the thumb loop 15, whereupon, the rod 7 is manipulated toward the tongs by the thumb causing them to close upon an object to be removed from a bottle or the like, the combined rod guide and handle brace acting to prevent the tong members 6 from spreading under the natural tendency of an individual's fingers to spread when so manipulating the thumb.

With this invention fully described it is manifest that a picking tool is provided which will readily facilitate removal of articles from places which cannot be reached by an individual's fingers and, through the simplicity of its construction it can be manufactured and marketed at a reasonable price.

Having thus described my invention what I claim and desire to protect by Letters Patent is:

In a picking tool, a pair of gripping members each consisting of a single strand of wire bent spirally at substantially its middle portion to form finger loops having at least one complete convolution with the wire extending tangentially from opposite sides thereof, the extended portions of the wire converging at an acute angle to form a pair of arms, the remaining portions of the wire being twisted together from the junction of the arms to points spaced from the wire ends and then diverging and provided with bent tips to form gripping fingers, said pair of gripping members having their twisted portions twisted together with the finger loops in substantially the same plane, a bridge and guide member consisting of a single strand of wire bent intermediate its ends to form a convolution constituting a guide eye and having its ends wrapped around the adjacent arms of the gripping member, and a grip actuating member consisting of a single strand of wire extending through said guide eye and having a guide loop at its lower end slidably engaging around the twisted together portions of the gripping members, said actuating member having its other end bent to form a finger loop in normal spaced relation to the guide eye.

MICHAEL JOSEPH SARNECKY.